United States Patent [19]

Tayefeh

[11] Patent Number: 5,204,847
[45] Date of Patent: Apr. 20, 1993

[54] SENSING PREVIOUSLY-RECORDED INFORMATION WHILE RECORDING OR ERASING A MAGNETOOPTIC STORAGE NUMBER

[75] Inventor: Morovat Tayefeh, Tucson, Ariz.

[73] Assignee: International Business Machines Corporation, Armonk, N.Y.

[21] Appl. No.: 789,865

[22] Filed: Nov. 12, 1991

Related U.S. Application Data

[63] Continuation-in-part of Ser. No. 438,902, Nov. 20, 1989, abandoned.

[51] Int. Cl.$^5$ .................. G11B 13/04; G11B 11/12
[52] U.S. Cl. ........................ 369/13; 360/59; 360/114; 369/58; 369/59
[58] Field of Search ............ 369/13, 54, 58, 59, 369/116, 121, 122, 124, 47; 360/59, 114; 365/122

[56] References Cited

U.S. PATENT DOCUMENTS

| | | | |
|---|---|---|---|
| 4,417,330 | 11/1983 | Hazel et al. | 369/32 |
| 4,419,750 | 12/1983 | Howe | 369/111 |
| 4,566,088 | 1/1986 | Yoshida et al. | 369/44 |
| 4,571,716 | 2/1986 | Szerlip | 369/54 |
| 4,606,016 | 8/1986 | Verboom et al. | 369/54 |
| 4,679,160 | 7/1987 | Kryder et al. | 369/13 |
| 4,710,911 | 12/1987 | Yamada et al. | 369/100 |
| 4,800,548 | 1/1989 | Koishi et al. | 369/54 |
| 4,879,703 | 11/1989 | Kaku et al. | 369/13 |
| 4,882,718 | 11/1989 | Kryder et al. | 369/13 |
| 4,916,680 | 4/1990 | Oldham | 369/13 |

FOREIGN PATENT DOCUMENTS 61-276149  12/1986  Japan .

*Primary Examiner*—Hoa Nguyen
*Attorney, Agent, or Firm*—H. F. Somermeyer

[57] ABSTRACT

A magnetooptic storage member is scanned by a single laser beam. The beam intensity is sufficient to heat a localized area of the storage member to be above the Curie temperature for enabling reversing the remanent magnetization of the localized area. Such localized area is subjected to a magnetic bias field for directing which of the remanent directions shall be assumed in the localized area. The storage member and laser beam are relatively moved such that a front or leading portion of the localized area does not reach the Curie temperature. The light reflected from this leading portion, which moves with the laser beam relative to the storage member, is detected for indicating the initial remanent state of the localized area before any changes are made by the combination of the magnetic bias field and the laser beam.

5 Claims, 2 Drawing Sheets ed as the beam
SENSING PREVIOUSLY-RECORDED INFORMATION WHILE RECORDING OR ERASING A MAGNETOOPTIC STORAGE NUMBER

RELATED APPLICATION

This application is a continuation-in-part of Ser. No. 07/438,902, filed Nov. 28, 1989 now abandoned.

FIELD OF THE INVENTION

The present invention relates to magnetooptic recorders and particularly to the sensing and recording or erasing information therefrom or thereon.

BACKGROUND OF THE INVENTION

To date, magnetooptic media have been notorious for surface or other media defects. The problem is sufficiently severe that every storage member employing magnetooptic recording should be surface analyzed for defects before data is actually recorded. Such surface analysis involved placing each storage member, such as a rotatable disk, into a recorder. The media is then written and read for defects for identifying the areal location of the defects and then the media is erased. Finally, those tracks with defects are marked for location of the defects as is known. It is desired to reduce to number of disk rotations or storage member movements in achieving the surface analysis, i.e. combining the read and the erasing.

It also has been the practice in magnetooptic recorders to take three rotations for updating data in place. The first rotation is to read the data and store it in an external memory. The second step is to erase the area to be rerecorded and the third rotation is to record the data. It is desired to reduce the number of rotations necessary for recording and for enabling update in place, i.e. changing certain data without erasing other data unnecessarily.

DISCUSSION OF THE RELATED ART

Yoshida, et al. in U.S. Pat. No. 4,566,088 show a two beam magnetooptic recorder in which the beams have different wave lengths such that a first light spot reads the information and the second light spot erases the recorded information. It is also possible, according to this teaching, to combine the two functions such that the combination of the first and second separate beams with different wave lengths can be used to erase the medium. That is, the first beam which is a read beam, partially heats the magnetooptic storage member in a localized area. The second beam continues the heating such that it exceeds the Curie temperature which demagnetizes the localized area. The second beam then effectively erases it through the use and in combination with the magnetic bias field, which is bias as the remanent magnetization to an erasure direction. It is desired to avoid the use of multiple beams in providing a read and erase or rewrite function Kryder, et al. in U.S. Pat. No. 4,679,180 show two widely spaced laser beams impinging upon a rotating disk. A first beam reads out the data and if the data is the same as what is to be recorded, no change is made to the magnetooptic media in that localized area. If there is a change in data, then the area is rerecorded by a writing laser. It is desired to avoid this complex arrangement with a simpler apparatus which also reduces cost.

SUMMARY OF THE INVENTION

It is an object of the present invention to provide for sensing previously recorded information while erasing or recording information on the localized area beam sensed.

In accordance with the present invention, a magnetooptic storage member and a laser beam are relatively moved at a predetermined relative speed. The intensity of the laser beam is such that a localized area of the storage member will be heated above the Curie temperature for enabling erasure or recording of information. The relationship of the laser beam intensity and a relative speed is such that an initial or leading portion of the impingement of the laser beam onto the localized area remains below the Curie temperature as the beam sweeps the storage member. This initial portion reflects light which can be read for ascertaining the recorded information existing in the area being scanned before the laser beam is applied for erasure, recording other information, or merely changing the direction of remanent magnetization. The reflected light is also useful for detecting defects in the localized area as the laser beam scans the storage member.

The foregoing and other objects, features and advantages of the invention will be apparent from the following more particular description of preferred embodiments of the invention, as illustrated in the accompanying drawings.

DETAILED DESCRIPTION

Figure 2:
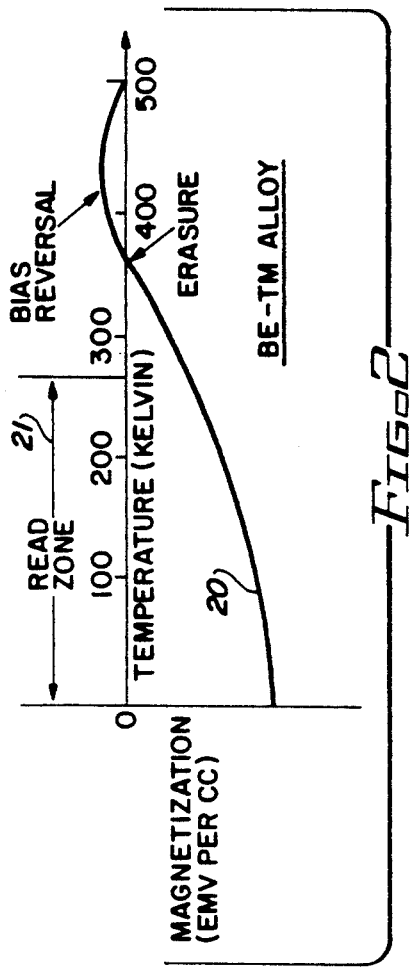
FIG. 2 is a graph illustrating the relationship of magnetization and temperature of a typical magnetooptic storage member.

Referring now more particularly to the drawing, like numbers indicate like parts and structural features in the various figures. A storage track 10 on storage member or rotatable magnetooptic disk 25, is scanned by a stationary erase beam 11 by the relative movement of track 10 in the direction of the arrow 12. The cross sectional shape of stationary erase beam 11 can be any desired shape, including circular, ovate and the like, as is known in the art. Laser beam 11 heats the magnetooptic storage layer (not shown) of storage member 25 and of which track 10 is a portion. Such heating has a finite delay based upon the characteristics of the various magnetooptic media as well as the relative speed between each magnetooptic medium and its associated erase beam. Until the storage layer is heated to the Curie temperature at which time magnetization of the localized area under the beam 11 is destroyed, i.e. becomes non-magnetic, that portion of the track 10 being scanned by the erase beam still reflects light which can be sensed for reading the informational signals recorded before beam 11 scans the track 10. As an example, when the relative speed between track 10 and erase beam 11 is relatively slow, then the thermal gradient is relatively sharp as indicated by the hatched area 13. This portion of the localized area being illuminated by erase beam 11 has not yet reached the Curie temperature and therefore remains as a magnetized area yet to be erased and therefore reflects light indicative of the stored information; i.e. the remanent magnetization in track 10 and area 13 modulates the erase beam 11, in the same manner that a read beam is modulated by such remanent magnetization, enabling the readback of information recorded just before it is being erased. Such detection is also useful for detecting defects in the storage medium, that is, when a defect is being encountered, the reflected light from area 13 is greatly reduced in the intensity therefore indicating the defect. Such defects then can be marked for avoidance in later recording or if sufficiently large, an entire sector or addressable storage area of a storage medium 25 can be marked as being unsuitable for recording. As the relative speed between track 10 and erase beam 11 increases, the aerial portion in the localized area illuminated by erase beam 11 increases. For example, dashed line 14 indicates an increased area resulting from an increased relative speed between track 10 and beam 11, while dashed line 15 indicates a much greater area because of greatly increased relative speed. Such changes in relative speed can be caused by differences in radii of the tracks is located on a rotatable magnetooptic storage member 25.

Figure 1:
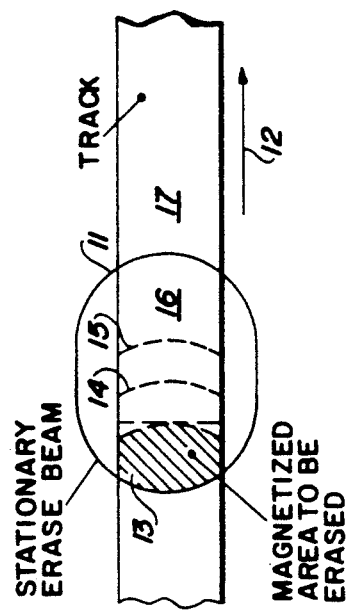
FIG. 1 illustrates operation of the invention on a single storage track of a magnetooptic storage member.

As seen in FIG. 1, the area 16 which is a trailing portion of the localized area illuminated by erase beam 11 is completely demagnetized, i.e. ready for erasure. The area 17 of track 10, which erase beam 11 has already passed over, has been erased as by a directing magnetic field provided through bias coil 26. In this regard magnetooptic media, a first direction of remanent magnetization is defined as an erasure or erased direction, such as a south pole being located at the upper or facing surface of track 10 as it faces the beam 11. The second or opposite direction of remanent magnetization defines information bearing signals, i.e. binary one's and so forth in various known recording formats. In this case, the north pole would be located at a surface of track 10 which faces away from beam 11. For recording information, the steering magnetic field provided by bias coil 26 is reversed for recording information bearing signals rather than recording an erasure direction.

In tests conducted employing a circular erase beam, successful readback of prerecorded information such as provided by light modulation caused by reflection of the light in area 13 was about one-fourth of the area of the total erasure beam illuminating a storage track. Based upon a relative speed between the erase beam and track 10 of 16 meters per second with a 12 milliwatt erase power light intensity at the recording surface of track 10 with a data rate from 2-3 megabytes per second with a recording density in pulse width modulation (PWM) of 30-38 kilobytes per inch. The modulated light intensity was equal to a readback by a read beam of the same area as the erase beam, but at 3 milliwatts. The reflected light intensity as modulated by the magnetized area to be erased 13 is a strong function of a relative speed of the storage medium and the erase beam is that effects the size of the area 13 and the light intensity of the erase beam 11. As relative speed between the storage medium and erase beam decreases, the erasing process causes the illuminated area of the erase beam to heat faster, thereby reducing the size of a magnetized area to be erased, that is illuminated by the erase beam. Such heating reduces the Kerr effect used in connection with modulating a light beam for sensing the information recorded on the track 10 and for indicating the direction of remanent magnetization of the track 10 prior to encounter with erase beam 11.

In another test on yet another type of magnetooptic storage medium, the erase beam 11 had a light intensity power at the recording surface of the storage medium of 8 milliwatts with a relative speed between the storage medium and the erase beam of 5 meters per second with a data transfer rate of 500 kilobytes per second resulted in 6–9 decibel reduction of signal amplitude with respect to a 3 milliwatt light intensity power read beam. The read beam and the erase beam had the same size in cross-section.

FIG. 2 illustrates remanent magnetization variation with the temperature of the magnetooptic recording materials. Curve 20 indicates a slight reduction at minor elevated temperatures up to about 150° Kelvin with a steady degradation of magnetization, hence a reduction of Kerr effect above 150° Kelvin. A read zone 21 is envisioned for the characteristics set forth in FIG. 2. Perfect erasure occurs at the zero crossing point of curve 20, i.e. complete demagnetization. The effect of the bias reversal is shown as occurring between about 350° Kelvin and 500° Kelvin. Various magnetooptic media will have similar curves but the quantities may differ. Depending upon the sensitivity of the readback system employed for reading the previously recorded information, read zone 21 won't either narrow or broaden out the extent of each read zone 21 as best empirically determined.

Figure 3:
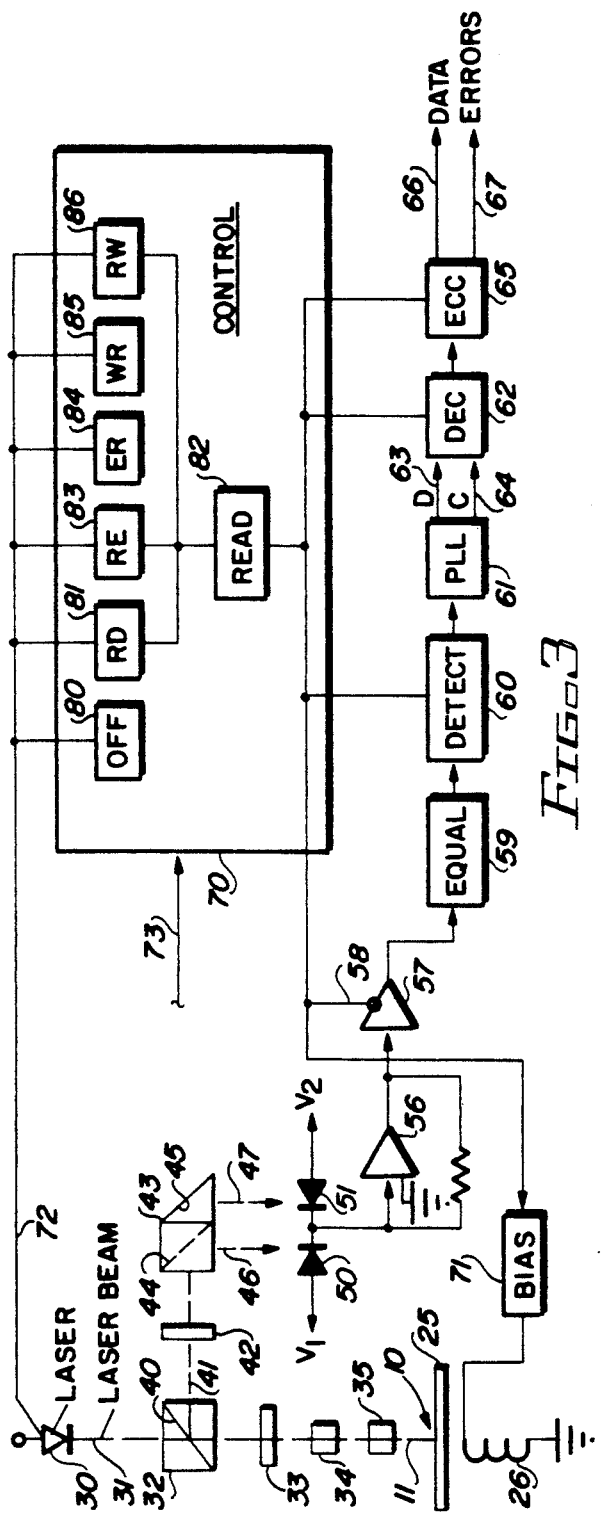
FIG. 3 is a simplified diagram showing operation of the invention in a magnetooptic recorder-player.
Figure 4:
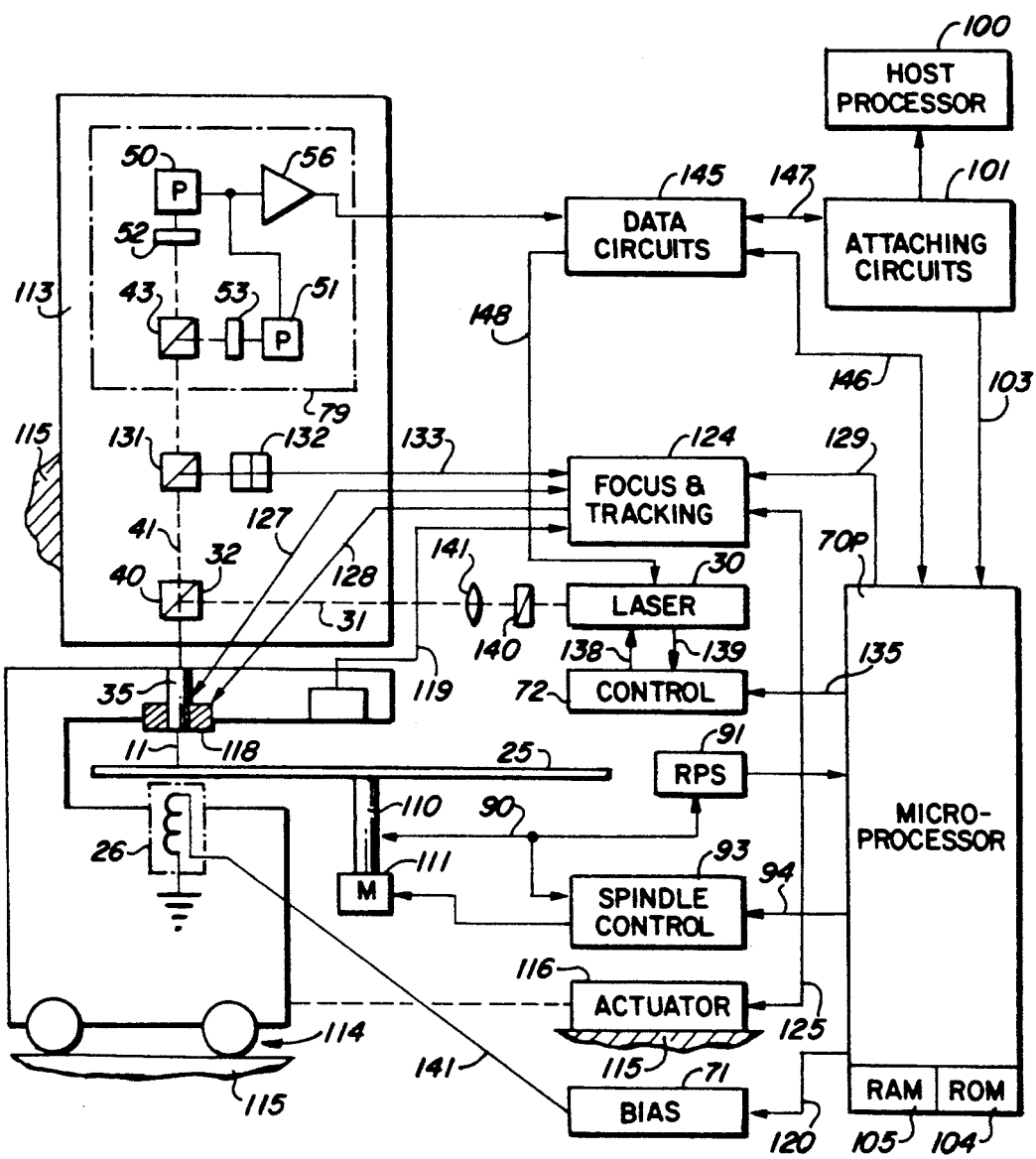
FIG. 4 illustrates a known magnetooptic recorder-player in which the FIG. 3 illustrated apparatus are preferably incorporated.

FIG. 3 is an abbreviated drawing of a magnetooptic recorder-player with which the present invention is advantageously employed, only the readback while erase portion of the recorder-player is illustrated; it being understood that in a practical embodiment, as shown in FIG. 4, recording circuits are provided and separate readback circuits are provided which do not cause a reversal of the magnetization, i.e. read without erase. A semiconductor laser 30 is suitably powered for emitting a light beam 31 through a polarization beam splitter 32, thence quarter wave plate 33, a beam shaper or mirror 34 and objective lens 35 onto a track 10 of rotating storage member 25. In the read while erase function described in accordance with the present invention, laser beam 31 is at a power level suitable for erasing the data recorded as remanent magnetization patterns on track 10. Bias coil 26 receives successively reversed electrical currents from bias control 71 for providing either an erasure or recording steering magnetic bias field in the area heated by laser beam 11.

Light reflected from track 10, such as in the magnetized area to be erased or in a read mode where an erasure does not occur, retraces the path of beam 11 through objective lens 35, mirror or beam shaper 34, quarter way plate 33 and to be reflected by the junction 40 of polarization beam splitter 32. The reflected beam turns to follow light path 41 through one-half wave plate 42, thence to a second beam splitter 43. Beam splitter 43 divides the beam on path 41 into two separate beams 46 and 47, respectively, by the half mirror 44 which is a junction of polarization beam splitter 43 and by the first surface exterior plain reflecting mirror 45. The two beams 46 and 47 are compared by the photo diodes 50 and 51, electrically powered as shown can be reverse biased. The different signal which is caused by the well known Kerr effect is to preamplifier 56. A voltage gain amplifier 57 is controlled by a signal received over line 58. The arrangement is such that the voltage gain of amplifier 57 can be such that the readback portion is degated such as during recording, or can have high gain, such as read while erase, and for readback without erase. The output of gain amplifier 57 passes through the usual equalizer and filter (EQUAL) 59 then is detected in detector 60. The output of detector 60 goes to a phase lock loop PLL 61 which separates a clock in the data signal from the detected signal. The clock signal is supplied over line 64, while the data signals slide over line 63 to a decoder 62, which decodes the data signal in accordance with the generated clock signal, as is known. The data output then is supplied to error detection and correction circuits ECC 65 which in turn output the corrected data signal over line 66 or provide for indication of uncorrectable errors supplied over line 67. The readback circuits are controlled by control 70, which includes a microprocessor (not shown), to be turned on only during readback operations. Additionally, control 70 provides a signal over line 72 to energize laser 30 to either a read intensity, a modulated write intensity, or an erasure intensity, all of which is well known and understood. Further, the direction of magnetic reversal is also under control 70 activating bias control 71 to control the direction of current flowing through coils 26.

In the prior art, during recording, bias circuit 71 activates coil 26 to provide a magnetic steering field to the localized heated area under beam 11 for causing a remanent magnetization in the second remanent direction. For erasure, the direction of the current is reversed in coil 26 for causing a magnetic steering field to effect remanence in track 10 in the first remanent magnetic direction. During the read operation the bias circuit 71 is disabled.

The read-recorded-data-while-erasing-such-recorded-data function is also useful in doing surface analysis on a storage member 25. In the prior art, a read signal was supplied through laser 30 for detecting defects, i.e. amplitude modulation of the reflected light would indicate defects. In this regard, it should be noted that the entire storage member 25 would have to be recorded before such a technique would be used. After such readback, the entire disk should be erased again with the defective sectors being marked, as is known. By using the present invention, after recording a disk, the stationary erase beam 11 causing a magnetized area to be erased, results in reading back the recorded test patterns on the disk as well as simultaneously erasing the recorded test patterns. The notation and indication of defective areas is beyond the present description but is well known in the art.

The use of a read-erase beam 11 is also useful for all data security purposes. The usual read of information from a magnetooptic disk leaves all of the recorded information. By the use of a read-erase beam 11, the recorded information can be read out and simultaneously erased for protecting the security of such information. Accordingly, it is desired to provide control 70 such that a read intensity be provided by laser 30, as is known in the art, and can be controlled by a single line 72. Secondly, the read-erase beam 11 is also desired to be provided in the same recorder-player for providing that security erase in addition to the enhanced surface analysis. Of course, the usual recording circuits will also be provided.

Another variation of the present invention is that erase beam can be turned into a recording beam wherein the minimum amplitude of the recording beam is the erasure and the bias current in coil 26 is selectively reversed for alternating between erased directions and recorded directions, i.e. first and second directions of remanent magnetization.

Control 70 receives input control from the usual host processor or controller card (not shown) over a cable diagrammatically represented by numeral 73, such as provided in FIG. 4 by microprocessor 70P. That is, control 70 is incorporated into the FIG. 4 microprocessor 70P such that line 73 represents the operations of microprocessor 70P for activating the control 70. Control 70 performs many functions not necessary to the understanding of the present invention. Those functions of course are eliminated. The laser control includes a plurality of states of operation. In one state 80 the laser 30 is turned to an off condition, such as a level below the readback level. Alternately, the off state may provide a laser 30 output level equal to the read level. In the read state 81, not only is laser 30 activated by a signal on line 72 to emit a readback while not erase level of light intensity, the read activating circuit 82 is actuated to activate amplifier 57, detector 60, decoder 62 and ECC circuit 65 into a read mode. The operation of these devices in the read mode is well understood and not explained further for that reason. The read-erase state RE 83 provides the erase beam 11, described earlier with respect to FIG. 1. This read-erase state provides activation of laser 30 to generate erase beam 11 and effectively simultaneously actuate read control 82 for activating the readback circuits above described with numerals 57-65. RE state 83 is used both in the usual read and the security read above described. A simple erase state 84 provides for erasure ER without readback. In this state a read control 82 is not activated. In write state 85, the laser 30 is activated to provide a recording beam which either can be modulated to light intensity above and below a threshold which causes a thermal increase to the Curie temperature or to a heating below the Curie temperature resulting in no changes. The later state provides for maintaining a previously erased state by the low intensity laser beam will cause reversal of the direction of remanent magnetization by an appropriate bias through coil 26 without changing the coil current, i.e. during the recording operation a constant current is flowing through coil 26, while the modulation of the remanent magnetization on storage member 25 is caused by the modulation of the light intensity from laser 30. The read before write state (RW) 86 causes a constant energy light beam to be emitted by laser 30, which is preferably a higher intensity beam than the erase beam 11. Modulation of the remanent magnetization is caused by modulating the bias current to coil 26 through selective reversals in accordance with the information to be recorded.

A known optical recorder with which the present invention may be advantageously employed is shown in FIG. 4. The magnetooptic record disk 25 is mounted for rotation on spindle 110 by motor 111. Optical portion 113 on frame 115 is in optical communication with lens 35. Lens 35 moves radially of disk 25 by movements of head carriage 114 and by fine actuator 118 which supports lens 35 and is movably mounted on carriage 114. A frame 115 of recorder suitably mounts carriage 114 for reciprocating radial motions. The radial motions of carriage 114 enable access to any one of a plurality of concentric tracks or circumvolutions of a spiral track for recording and recovering data on and from disk 25. Linear actuator 116 suitably mounted on frame 115, radially moves carriage 114 for enabling track accessing. The recorder is suitably attached to one or more host processors 100, such host processors may be control units, personal computers, large system computers, communication systems, image process processors, and the like. Attaching circuits 101 provide the logical and electrical connections between the optical recorder and the attaching host processors 100.

Microprocessor 70P controls the recorder including the attachment to the host processor 100. Control data, status data, commands and the like are exchanged between attaching circuits 101 and microprocessor 70P via bidirectional bus 103. Included in microprocessor 70P is a program or microcode- storing, read-only memory (ROM) 104 and a data and control signal storing random-access memory (RAM) 105. The optics of the recorder include an objective or focussing lens 35 mounted for focussing and tracking motions on head arm 113 by fine actuator 118. This actuator includes mechanisms for moving lens 35 toward and away from disk 25 for focussing and for radial movements parallel to carriage 114 motions; for example, for changing tracks within a range of 100 tracks so that carriage 114 need not be actuated each time a track adjacent to a track currently being accessed is to be accessed. Numeral 11 denotes a two-way light path between lens 35 and disk 25.

In magnetooptic recording, magnet coil 26 in a constructed embodiment (magnet coil 26 is an electromagnet) provides a weak magnetic steering or bias field for directing the remnant magnetization direction of a small spot on disk 25 illuminated by laser light from lens 35. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,971,1017). This heating enables magnet coil 26 to direct the remnant magnetization to a desired direction of magnetization as the spot cools below the Curie point temperature. Magnet coil 26 is shown as oriented in the "write" direction, i.e., binary ones are recorded on disk 25 normally are "north pole remnant magnetization". To erase disk 25, magnet coil 26 reverses its magnetic field such that the south pole is adjacent disk 25. Magnet coil 26 bias control 71 is electrically coupled by line 141 to electromagnet coil 26. Bias control 71 controls the write and erase directions of the electromagnet coil 26 produced magnetic steering field . Microprocessor 70P supplies control signals over line 120 to control 71 for effecting reversal of the recording direction.

It is necessary to control the radial position of the beam following path 11 such that a track or circumvolution is faithfully followed and that a desired track or circumvolution is quickly and precisely accessed. To this end, focus and tracking circuits 124 control both the coarse actuator 116 and fine actuator 118. The positioning of carriage 114 by actuator 116 is precisely controlled by control signals supplied by circuits 124 over line 125 to actuator 116. Additionally, the actuator control by circuits 124 is exercised by control signals travelling over lines 127 and 128 respectively for focus and fine tracking and switching actions of fine actuator 118. Sensor 56 senses the relative position of fine actuator 118 to head arm carriage 113 and supplies a relative position signal over line 139.

The focus and tracking position sensing is achieved by analyzing laser light reflected from disk 25 over the light path including lens 35 as beam 11, thence through lens 35, through one-half mirror 40 and to be reflected by half-mirror 131 to a so-called "quad detector" 132. Quad detector 132 has four photo elements which respectively supply signals on four lines collectively denominated by numeral 133 to focus and tracking circuits 124. Aligning one axis of the detector 132 with a track center line, track following operations are enabled. Focussing operations are achieved by comparing the light intensities detected by the four photo elements in the quad detector 132. Focus and tracking circuits 124 analyze the signals on lines 133 to control both focus and tracking.

Recording or writing data onto disk 25 is next described. It is assumed that magnet coil 26 is supplying a steering or magnetic bias field for recording data. Microprocessor 70P supplies a control signal over line 135 to laser control 72 for indicating that a recording operation is to ensue. This means that laser 30 is energized by control 72 (see line 72 in FIG. 3 as it receives control signals from elements 8086 which are in microprocessor 70P. Line 72 represents any amplifiers and limiters as used to control lasers in a known manner.) to emit a high intensity laser light beam for recording; in contrast, for reading, the laser 30 emitted laser light beam is a reduced intensity for not heating the laser illuminated spot on disk 25 above the Curie point. Control 72 supplies its control signal over line 138 to laser 30. Data circuits 145 supply data or write pulses over line 148 for modulating the operation of semiconductor laser 30 in a known manner. The laser 30 modulated light beam passes through polarizer 140 (linearly polarizing the beam), thence through collimating lens 140 toward half mirror 60 for being reflected toward disk 25 through lens 35. Data circuits 145 are prepared for recording and the microprocessor 70P supplied suitable control signals over line 146. Microprocessor 70P includes control circuits for effecting and controlling machine operations that occur too fast for being effected and controlled by microcode execution. Microprocessor 70P, in preparing data circuits 145, is responding to commands for recording received from a host processor 100 via attaching circuits 101. Once data circuits 145 are prepared, data is transferred directly between host processor 100 data circuits 145 through attaching circuits 101. Data circuits 145 include ancillary circuits (not shown in FIG. 4) relating to disk 25 format signals, error detection and correction and the like. Such ancillary circuits are shown in FIG. 3. Circuits 145, during a read or recovery action, strip the ancillary signals from the readback signals before supply corrected data signals over bus 147 to host processor 100 via attaching circuits 101.

Reading or recovering data from disk 25 for transmission to a host processor requires optical and electrical processing of the laser light beam from the disk 25. That portion of the reflected light (which has its linear polarization from polarizer 140 rotated by disk 25 recording using the Kerr effect) travels along the two-way light path carrying beam 11, through lens 35 and half-mirrors 40 and 131 to the data detection portion 79 of the optics 113. Half-mirror or beam splitter 43 divides the reflected beam into two equal intensity beams, both having the same reflected rotated linear polarization. The half-mirror 43 reflected light travels through a first polarizer 52 which is set to pass only that reflected light which was rotated when the remnant magnetization on disk 25 spot being accessed has a "north"0 or binary one indication. This passed light impinges on photo cell or diode 50 for supplying a suitable indicating signal to amplifier 56, as also shown in FIG. 3. When the reflected light is rotated by a "south" or erased pole direction remnant magnetization, then polarizer 53 passes no or very little light resulting in no active signal being supplied by photo cell or photo diode 51. The opposite operation occurs by polarizer 53 which passes only "south" rotated laser light beam to photo cell 51. Photocell 51 supplies its signal indicating its received laser light to the amplifier 56. The amplifier 56 supplies the resulting difference signal (data representing) to data circuits 145 for processing, as shown in FIG. 3 as elements 57-65. The detected signals include not only data that is recorded but also all of the so-called ancillary signals as well. The term "data" as used herein is intended to include any and all information-bearing signals, preferably of the digital or discrete value type.

The rotational position and rotational speed of spindle 110 is sensed by a suitable tachometer or emitter sensor 90. Sensor 90, preferably of the optical sensing type that senses dark and light spots on a tachometer wheel (not shown) of spindle 110, supplies the "tach" signals (digital signals) to rotational position sensing (RPS) circuit 91 which detects the rotational position of spindle 110 and supplies rotational information-bearing signals to microprocessor 70P. Microprocessor 70P employs such rotational signals for controlling access to data storing segments on disk 25 as is widely practiced for accessing magnetic data storing disks. Additionally, the sensor 90 signals also travel to spindle speed control circuits 93 for controlling motor 111 to rotate spindle 110 at a constant rotational speed. Control 93 may include a crystal controlled oscillator for controlling motor 111 speed, as is well known. Microprocessor 70P supplies control signals over line 94 to control 93 in the usual manner.

While the invention has been particularly shown and described with reference to a preferred embodiment thereof, it will be understood by those skilled in the art that various changes in form and details may be made therein without departing from the spirit and scope of the invention.

What is claimed is:

1. A magnetooptic recorder-player comprising:
    optical means including laser means for irradiating a single laser beam onto a magneto-optical recording layer in a data storage member, said storage member recording layer having a plurality of tracks, each said track having magnetic remanence for representing recorded information, said magnetic remanence being stable at temperatures below at Curie point of said recording layer and being astable at temperatures above said Curie point, said laser beam having a rotatable linear polarization, said recording layer rotating the linear polarization of the laser beam in a rotational direction representative of magnetic polarity of said magnetic remanence as the recording layer reflects the laser beam;
    first means coupled to said laser means for activating said laser means to emit said single laser beam with an intensity sufficient for sensing but not altering any recorded information in said storage member such that the laser beam is reflected by said recording layer to the optical means as a first reflected laser beam having rotational modulation of said linear polarization rotated to be representative of said magnetic remanence representing information recorded in the recording layer;
    second means coupled to said laser means for activating said laser means to emit said single laser beam with an intensity sufficient for momentarily raising the temperature of an irradiated area of the storage member to be above said Curie point for erasing any information recorded in said irradiated area;
    magnetic biasing means for supplying a bias magnetic field to said irradiated area, said bias magnetic field having a first magnetic polarity representative of an erasure direction of said magnetic resonance, erasure direction representing no recorded information;
    moving means for relatively moving said storage member and said optical means for causing the laser beam to scan one of said tracks at a rate such that the temperature of a leading edge portion of the irradiated area is less than the Curie point while the temperature of a remaining portion of the irradiated area is raised above the Curie point for erasing said recorded information in the remaining portion, said leading edge portion reflecting and modulating a linear polarization of said laser beam as a second reflected laser beam for indicating said recorded information;
    control means coupled to said magnetic biasing means, said moving means and to said second means for simultaneously activating said magnetic biasing means, said moving means and said second means for erasing a predetermined portion of said one track; and
    reading means in said optical means for receiving and responding to said first and second reflected laser beams for demodulating the respective rotated linear polarization of the first and second reflected laser beams for generating electrical signals representing said recorded information.

2. In the magnetooptic recorder-player set forth in claim 1, further including:
    third means coupled to said laser means for activating said laser means to emit said single laser beam having an information modulated intensity between an intensity sufficient for sensing any recorded information on said storage member and an intensity sufficient for heating said area on said storage member to above said Curie point; and
    said control means having recording effecting means coupled to said third means, said moving means and said magnetic biasing means for simultaneously activating the magnetic biasing means to supply said bias magnetic field having a magnetic polarity opposite to said first magnetic polarity, actuating said moving means to relatively move the optical means and the storage member and actuating said third means to activate said laser means to irradiate said intensity modulated laser beam for recording information on the storage member, said control means activating one and only one of said first, second or third means at any one time.

3. A method of recording and reading information on a magnetooptical recording medium having a magnetooptical recording layer with Curie point below which magnetic remanence of said recording medium is stable and above said Curie point the magnetic remanence of said recording layer is unstable, a magneto-optical recorder-player having a laser means for irradiating a laser beam onto a beam illuminated area of said magnetooptical recording layer for gradually heating said beam illuminated area to a temperature above said Curie point, said optical recorder-player having a magnetic biasing means for providing a magnetic bias field to the recording layer at said laser beam illuminated area having a first magnetic polarity, said beam illuminated area reflecting at least a portion of said irradiated laser beam said laser beam having a rotatable linear polarization and said recording layer reflecting said layer beam to a detection means, said recording layer rotating the linear polarization of the reflected laser beam using a Kerr effect; comprising the steps of:

activating said laser means to irradiate said laser beam onto the recording layer to said laser beam illuminated area of the recording layer encompassed by said magnetic bias field and having an intensity to gradually heat the beam illuminated area of the recording layer receiving the laser beam to a temperature above the Curie point;

moving the recording medium and the laser beam relative to each other so that the laser beam scans a track on the recording layer at a rate wherein the laser beam illuminated area on the recording layer has a leading portion in which temperature remains below the Curie point and a remaining portion of the beam illuminated area having a temperature above the Curie point; and sensing said laser beam reflected from the leading portion of said laser beam illuminated area and analyzing the reflected laser beam to indicate a direction of said remanent magnetization.

4. A method of recording and reading information as set forth in claim 3, further including the steps of:

activating the laser means continuously to irradiate said laser beam to impinge on said scanned portion with insufficient intensity to raise the temperature of said scanned portion of said predetermined track to above said Curie point; and sensing the reflected laser beam for detecting said rotated linear polarization to indicate whether said remnant magnetization direction in said scanned portion of said one track; and activating said detection means for supplying a read control signal to said laser means to control the intensity of said laser beam.

5. A magnetooptic recorder-player having laser and optical means for shining a single laser beam onto a magnetooptic recording layer in a storage member, said recording layer having a Curie point, a plurality of tracks in the recording layer for recording data;

the improvement including, in combination:

mover means coupled to the storage member for relatively moving the storage member and the laser and optical means at a predetermined relative speed for causing the single laser beam to scan a track on the recording layer at said predetermined speed;

first means in the recorder-player coupled to the laser and optical means for actuating said laser and optical means to emit said single laser beam to illuminate an area of said track during said scanning, said laser beam having an intensity sufficient for sensing any recorded information in the recording layer for heating the illuminated area in said recording layer to a temperature below said Curie point whereby a current direction of remanent magnetization in said track is sensed without reversing said remanent magnetization, said illuminated area reflecting said laser beam as a first reflected laser beam;

second means in the recorder-player coupled to the laser and optical means for actuating said laser and optical means to emit said single laser beam with a light intensity for gradually heating said illuminated area for creating a leading portion of the illuminated area having a temperature less than said Curie point of said recording layer and creating a remaining portion of the illuminated area having a temperature in said recording layer greater than the Curie point, said leading portion reflecting said laser beam as a second reflected laser beam;

magnetic biasing means for supplying a magnetic bias field to said illuminated area having a given magnetic polarity for biasing the magnetization direction in said remaining portion to said given magnetic polarity; and reading means operatively coupled to the laser and optical means for receiving said first and second reflected laser beams for reading information recorded in the recording layer of the storage member.

* * * * *

UNITED STATES PATENT AND TRADEMARK OFFICE
CERTIFICATE OF CORRECTION

PATENT NO. : 5,204,847
DATED : April 20, 1993
INVENTOR(S) : Morovat Tayefeh

It is certified that error appears in the above—identified patent and that said Letters Patent is hereby corrected as shown below:

```
     Title page, title, line 4,
item [54] SENSING PREVIOUSLY-RECORDED INFORMATION
         WHILE RECORDING OR ERASING A MAGNETOOPTIC
         STORAGE MEMBER (The word "number" was incorrectly substituted
         for the word --member--.)
```

At column 8, line 68, the words "has a "north"0 or binary one" should be --has a "north" or binary one--.

At column 9, line 52, the words "temperatures below at" should be --temperatures below a--.

At column 10, line 12, the words "magnetic resonance" should be --magnetic remanence--.

Signed and Sealed this

Nineteenth Day of July, 1994

Attest:

BRUCE LEHMAN

*Attesting Officer*     *Commissioner of Patents and Trademarks*